(12) United States Patent
Menezes et al.

(10) Patent No.: US 8,150,677 B2
(45) Date of Patent: Apr. 3, 2012

(54) MACHINE TRANSLATION USING LANGUAGE ORDER TEMPLATES

(75) Inventors: Arul A. Menezes, Sammamish, WA (US); Christopher B. Quirk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 12/146,531

(22) Filed: Jun. 26, 2008

(65) Prior Publication Data

US 2009/0326911 A1 Dec. 31, 2009

(51) Int. Cl.
G06F 17/28 (2006.01)
(52) U.S. Cl. .................. 704/2; 704/277; 704/5
(58) Field of Classification Search ............ 704/1–10, 704/257, 277, 270, 270.1, 251–255
See application file for complete search history.

(56) References Cited

U.S. PATENT DOCUMENTS

| | | | |
|---|---|---|---|
| 5,930,746 A | 7/1999 | Ting | |
| 6,442,524 B1 * | 8/2002 | Ecker et al. | 704/277 |
| 7,209,875 B2 | 4/2007 | Quirk et al. | |
| 7,295,963 B2 | 11/2007 | Richardson et al. | |
| 2004/0024581 A1 | 2/2004 | Koehn et al. | |
| 2004/0030551 A1 | 2/2004 | Marcu et al. | |
| 2006/0015320 A1 | 1/2006 | Och | |
| 2007/0282590 A1 | 12/2007 | Suzuki et al. | |

OTHER PUBLICATIONS

Ding, et al., "Automatic Learning of Parallel Dependency Treelet Pairs", The First International Joint Conference on Natural Language Processing (IJCNLP-04), 8 pages.

Matusov, et al., "Statistical Machine Translation of Spontaneous Speech with Scarce Resources", In Proceedings of the International Workshop on Spoken Language Translation (IWSLT), Sep. 2004, pp. 139-146.

Michael Carl, "Inducing Translation Templates for Example-Based Machine Translation", MT Summit VII, Sep. 1999, pp. 250-258.

David Chiang, "A Hierarchical Phrase-Based Model for Statistical Machine Translation", Proceedings of the 43rd Annual Meeting on Association for Computational Linguistics, Annual Meeting of the ACL, 2005, pp. 263-270.

Galley, et al., "What's in a Translation Rule?", Proceedings of the Human Language Technology conference, 2004, 8 Pages.

Graehl, et al., "Training Tree Transducers", In HLT-NAACL, 2004, 8 pages.

Huang, et al., "Statistical Syntax-Directed Translation with Extended Domain of Locality", In Proceedings of the 7th Biennial Conference of the Association for Machine Translation in the Americas (AMTA), 2006, 8 pages.

(Continued)

*Primary Examiner* — Huyen X. Vo (74) *Attorney, Agent, or Firm* — Microsoft Corporation (57) ABSTRACT

Many machine translation scenarios involve the generation of a language translation rule set based on parallel training corpuses (e.g., sentences in a first language and word-for-word translations into a second language.) However, the translation of a source corpus in a source language to a target corpus in a target language involves at least two aspects: selecting elements of the target language to match the elements of the source corpus, and ordering the target elements according to the semantic organization of the source corpus and the grammatic rules of the target language. The breadth of generalization of the translation rules derived from the training may be improved, while retaining contextual information, by formulating language order templates that specify orderings of small sets of target elements according to target element types. These language order templates may be represented with varying degrees of association with the alignment rules derived from the training in order to improve the scope of target elements to which the ordering rules and alignment rules may be applied.

20 Claims, 7 Drawing Sheets

OTHER PUBLICATIONS

Huang, et al., "Forest Rescoring: Faster Algorithms for Decoding with Integrated Language Models", 2007, 8 pages.

Koehn, et al., "Statistical Phrase Based Translation", Proceedings of the 2003 Conference of the North American Chapter of the Association for Computational Linguistics on Human Language Technology—vol. 1, North American Chapter of the Association for Computational Linguistics, 2003, pp. 48-54.

Marcu, et al., "SPMT: Statistical Machine Translation with Syntactified Target Language Phrases", Proceedings of the 2006 Conference on Empirical Methods in Natural Language Processing (EMNLP 2006), Sydney, Jul. 2006, pp. 44-52.

Och, et al., "A Systematic Comparison of Various Statistical Alignment Models", Computational Linguistics, vol. 29, No. 1, 2003, pp. 19-51.

Franz Josef Och, "Minimum Error Rate Training in Statistical Machine Translation", Proceedings of the 41st Annual Meeting of the Association for Computational Linguistics, Jul. 2003, pp. 160-167.

Och, et al., "The Alignment Template Approach to Statistical Machine Translation", Computational Linguistics, vol. 30, No. 4, 2004, pp. 417-449.

Papineni, et al., "BLEU: A Method for Automatic Evaluation of Machine Translation", Proceedings of the 40th Annual Meeting of the Association for Computational Linguistics (ACL), Philadelphia, Jul. 2002, pp. 311-318.

Quirk, et al., "Dependency Tree Translation: Syntactically Informed Phrasal SMT", Nov. 22, 2004, 49 pages.

Zens, et al., "Improvements in Phrasebased Statistical Machine Translation", Proc. of the Human Language Technology Conference, HLT-NAACL'2004, 2004, 8 pages.

Heidorn, George. "Intelligent writing assistance". In Dale etal. Handbook of Natural Language Processing, Marcel Dekker. (2000).

Koehn, Philipp and Christof Monz. Manual and automatic evaluation of machine translation between European languages. Workshop on Machine Translation, NAACL 2006.

Menezes, Arul, Kristina Toutanova and Chris Quirk. Microsoft Research Treelet translation system: NAACL 2006 Europarl evaluation. Workshop on Machine Translation, NAACL 2006.

* cited by examiner

MACHINE TRANSLATION USING LANGUAGE ORDER TEMPLATES

BACKGROUND

Machine translation techniques involve a translation of a source corpus in a source language to a target corpus in a target language (e.g., a source passage in the English language to a target passage in the Spanish language.) Such machine translation techniques often involve choosing elements of the target language that match respective elements of the source corpus, and may be facilitated by referencing a translation set, such as a unidirectional or bidirectional dictionary.

Many types of machine translators may be devised by designing a learning algorithm, such as an artificial neural network or an expert system, and training the algorithm against a training data set, such as many corpora of the source language associated with equivalent, narrowly tailored corpora of the target language (e.g., an English-language passage and a word-for-word translation to a Spanish passage.) By training against a sufficiently large training data set, the machine translator may be equipped with a set of translation heuristics and/or configured with a desirable selection of translation parameters that guide the searching and translating techniques.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A significant challenge for many machine translation scenarios arises from the syntactic constraints of the source language and the target language. Specifically, an accurate translation involves not only a selection of elements in the target language that are acceptably equivalent to the elements of the source language, but also an ordering of the elements to satisfy the standards of the target language. Different languages may have different rules for correctly ordering the elements of the language, so it may not be acceptable to order the translated elements of the target language according to the ordering of elements in the source language.

Many machine translation techniques attempt to derive translation and ordering heuristics together from the training data set, and thereby formulate one or more rules that capture both features (e.g., a rule that "old man" in English translates to "hombre viejo" in Spanish, both in choice of words and ordering.) However, combined rules may be overly specific, and may be difficult to generalize to cover many syntactic variations (e.g., if similar ordering is a prerequisite of a rule for a translation of "old man," then "old and very wise man" may not detected by the same rule.)

An alternative technique for improving the applicability of translation rules and heuristics involves generating ordering rules from the training data set apart from (a) any element translation and (b) alignment rules generated therefrom. The ordering rules may be formulated as templates specifying an ordering of element types in the target language; e.g., analyzing the Spanish phrase "hombre viejo" may result in an ordering template of "noun-adjective" for the ordering of such word types (as opposed to the "adjective-noun" ordering in the analogous English phrase "old man.") The training may therefore result in a set of small ordering templates that may inform the ordering of elements translated from the source corpus into the target language. Moreover, deriving small ordering templates may facilitate the combination of such templates to cover a wider range of linguistic structure in the source corpus. For example, a first Spanish language ordering template specifying a "noun-adjective" ordering and a second Spanish language ordering template specifying an "adverb-adjective" ordering may be utilized to order the phrase "very old man" correctly as "noun-adverb-adjective," or "hombre muy viejo." The ordering of elements may be performed in many ways, and may be combined with other aspects of the translation (such as the aligning of elements) to provide additional improvements in machine translation.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Machine translation techniques may be developed with a proficiency at translating from a source corpus specified according to a source language to a target corpus specified according to a target language. The corpora may comprise (e.g.) a human-readable document, such as a news article; a computer-readable document, such as a programming language; or a data set, such as an image structured according to one language (e.g., pixels in a two-dimensional image representation) and to be used as the basis for generating an image structured according to another language (e.g., voxels in a three-dimensional image representation.)

Machine translation techniques often involve the training of a learning algorithm, such as an artificial neural network, using training corpora, such as a corpus in the source language and a semantically equivalent translation of the corpus in the target language. For example, a Spanish-to-English machine translator may be trained using a set of Spanish sentences with semantically equivalent English translations. The machine translator may therefore be trained to recognize semantically equivalent aspects of the translation between the languages, e.g., the rules for inserting the English articles "a," "an," and "the" in a target English sentence in view of the contents of the source Spanish sentence.

Syntax-based machine translation techniques extend these concepts with the use of an external parser that breaks the source corpus into a sequence of elements, annotates each element with an element type (such as a part of speech, e.g., noun, verb, or determiner), and identifies another element in the corpus that is semantically superior to the element. This information is synthesized as a dependency tree representing the relationships between the elements of the corpus, with the predominantly superior element positioned as the root node of the tree. A syntax-based machine translator learns rules that involve a syntactic representation, e.g. a pair of dependency trees representing the corpora. A syntax-directed translator operates on a parsed representation of the source language. One approach for syntax-directed translation involves the use of top-down transduction rules, which are formulated as a source language tree and a target language tree, each comprising two types of nodes: an element type node specifying an element type in the language represented by a tree (and may have other children), or a variable that corresponds to a variable in the other tree and has no child nodes. A transduction rule may be found to match a dependency tree at a given node if we can find a correspondence from each element of the of the transduction rule to a node of the dependency tree; e.g., if the rule node has a lexical item, then this lexical item matches that of the input tree node and all children of that input tree node have a correspondence with some lexical item node. Such rules can be applied to transduce the source tree into a target tree.

A translation technique based on the use of transduction rules may transform an input tree structure into an output tree structure using a tree transducer, which is a set of small mappings that can transform trees by recursive application. For example, we might start with an operator tree *(2, +(3, 4)) to represent the mathematical expression "2*(3+4)". Each operator + and * takes a list of children as arguments, and represents the action of adding or multiplying their values. A tree transducer is composed of a set of rules, each of which has a left-hand-side tree containing 0 or more distinct variables (each of which has no children), and a right-hand-side with an equivalent set of variables (again with no children); each such rule describes how a tree may be transformed. For example, one such ruleset might be "*(X, +(Y, Z))→+(*(X, Y),*(X,Z))", "2→2", "3→3", "4→4", which distributes multiplication across addition. A rule matches a given input tree at a given node via a mapping from the rule left-hand-side nodes to the input tree nodes, such that each input node is either (a) mapped to by a variable, or (b) has the same label as the node mapped to it and all its children are also mapped to by some other rule node. To apply a ruleset to an input tree, we find a rule that matches the root node, then replace the input tree by the right-hand-side of the rule, with each variable replaced by the result of recursively applying the transducer. Returning to the example ruleset from above, we can transduce the input tree "*(2, +(3, 4))" into the output tree "+(*(2, 3), *(2, 4))". Often many rules may match at a given node. We can also associate a score with each rule in a transducers ruleset that represents the "goodness" of that rule.

Some techniques use treelet translation, involving a treelet that comprises a connected set of subnodes of the dependency tree. Treelet translation extracts pairs of source and target treelets from the parallel training data. First, the source training corpus is parsed into dependency trees, and the target training corpus is separated into a sequence of elements. An alignment between the source elements and target elements is computed according to element alignment techniques. Based on this alignment, candidate treelet translation pairs are evaluated; if all of the elements of a candidate source treelet align to a at least one element in the target training corpus, and that set of target elements is aligned only to the source treelet, then the candidate treelet pair is extracted. This evaluation is performed across the training corpora, and a set of pairs along with is compiled, along with a frequency with which each treelet pair arises in the training corpora. Finally, a probability for each source language treelet is computed given the source treelet is computed by dividing the count of times the pair occurred by the number of times that the source treelet arises. Given an input parse structure (such as a dependency tree), a treelet translation pair may contain sufficient information to translate a subset of the elements, and specifies the relative order between them. However, treelets are underspecified with respect to transduction rules, because they do not specify the ordering of uncovered children. Therefore, the process of finding the best translation is often much more computationally intensive than that of transduction approaches, since a large number of potential reorderings are considered during the search.

To bridge the gap between treelet translation pairs and transduction rules while enabling a faster translation, order templates may be devised, which are simple, single-level transduction rules that specify the ordering of element types of the elements of the corpora, and that specify the ordering of the children of a given node relative to its parent. According to this technique, the training produces a language translation mapping set that serves to guide the translation of future source corpora into target corpora (and/or vice versa.) The information embodied in the language translation rule set includes treelet translation pairs for translating lexical items from the first language to the second language (e.g., for choosing the Spanish term "hombre" for the English term "man," and vice versa.) In addition, the language translation mapping set contains order templates that specify the ordering of target language child nodes with respect to their parent nodes, given a match on element types in the source language.

One significant aspect of translation that may be involved in generating a correct target corpus is the ordering of translated elements. A machine translator may perform an element-for-element translation of the source corpus according to many techniques, but assembling the resulting elements of the second language in an acceptable order may be difficult. For example, the English language sentence "a very old man" may be correctly translated into the Spanish language sentence "un hombre muy viejo," but a word-for-word back-translation to English produces the jumbled English language phrase "a man very old." Different languages may involve different rules for the ordering of elements, and a machine translation that does not select an adequate ordering of the elements may produce an incorrect jumble of elements. For example, the ancient Latin language specified a "subject-object-verb" ordering, and complex phrases of many words might separate the subject and object from the verb at the end of a sentence. Back-translating an ancient Latin corpus such as "alterius non sit qui suus esse potest" to English (correctly translated as "let no man belong to another who can belong to himself") without language-based reordering might result in a jumbled phrase (such as "another not belong who to himself is able.")

Some techniques attempt to model translation ordering heuristics within the rules that also facilitate translation. For example, a training algorithm may be devised to select fragments from a parallel corpus (e.g., "old man") and to generate rules that both specify element translations into the target language (e.g., "old" translates to "viejo," and "man" translates to "hombre") and also the ordering of the translated elements (e.g., specifying an ordering of the elements selected for "man" followed by the elements selected for "old".) In this manner, the training may produce a language translation rule set comprising rules that specify both translation of small phrases and the ordering of the translated elements. However, the representation of both facets of the translation process in one rule may limit the generality of the rules. For example, it may be difficult to extend the rule specifying an ordering and translating of the English phrase "old man" to other phrases, such as "old and wise man," because the rule may be evaluated as "adjective-noun" element types while the phrase to be translated comprises "adjective-conjunction-adjective-noun" element types. In order to cover the full range of linguistic constructs in either language, a language translation rule set may comprise a large number of such rules, each applying only to a small set of fragments having very similar elements in a predefined order. The large number of rules therefore increases the duration of the search while parsing a first language corpus, and also increases the potential for search error leading to less accurate translations.

An alternative translation technique involves a distinction between the selection of elements for translation and the ordering of elements in the resulting translation. According to this alternative technique, from the parallel corpus "old man"/ "hombre viejo," two types of rules may be derived: an alignment rule that translates the elements of the phrase "old man" as (respectively) "viejo" and "hombre," and an ordering rule that organizes "adjective/noun" element types of the target (Spanish) corpus by ordering the noun before the adjective. Because these rules represent distinct types of linguistic information, the rules gleaned from the parallel corpus may be generalized in several ways: by specifying the selection of target language elements "viejo" and "hombre" for similar first language phrases (e.g., "very old man," "strong, old, and wise man," and "elderly man"), and by specifying the ordering of the adjective "viejo" after the noun "hombre" in phrases including the phrase "old man" (e.g., "hombre [muy] viejo" and "hombre [fuerte] viejo [y sabio]"). The rules could also be extrapolated to inform similar phrases (e.g., using a similar "noun-adjective" ordering for the phrase "young boy" to produce "muchacho joven".) Thus, this alternative technique involves a looser coupling of the alignment information of first language elements to second language elements and the ordering information of the second language elements so produced. However, the alignment and ordering are not necessarily decoupled and applied in isolation. For example, the alignment analysis may inform the ordering of elements, such as by producing a dependency tree that defines the subordinate relationships of the elements, which may facilitate selections of ordering rules that might otherwise be ambiguous. For example, in the phrase "old, very wise man," the alignment analysis may associate the adverb "very" with the adjective "wise" instead of the adjective "old," which may facilitate a selection of a correct ordering "hombre viejo y muy sabio" rather than the ordering "hombre muy viejo y sabio," which translates incorrectly to "very old, wise man.") The representation of the ordering templates with respect to the translation and alignment rules may improve the context-sensitivity of the application of the language translation rule set while preparing the target corpus.

According to this technique, the training of the machine translator may produce ordering templates that indicate how certain element types are ordered in a target corpus that complies with the specifications of the target language. These ordering templates might be represented alongside the alignment and translating rules to include contextual information that may be utilized to produce more accurate translations, while also not unduly restricting respective rules to a narrow set of linguistic constructs. This organization therefore imparts flexibility on the rules that reduces the number of rules covering the full range of lexical constructs in either language, reduces the duration of the search during a translation of a corpus, and reduces the possibility of search error.

Figure 1:
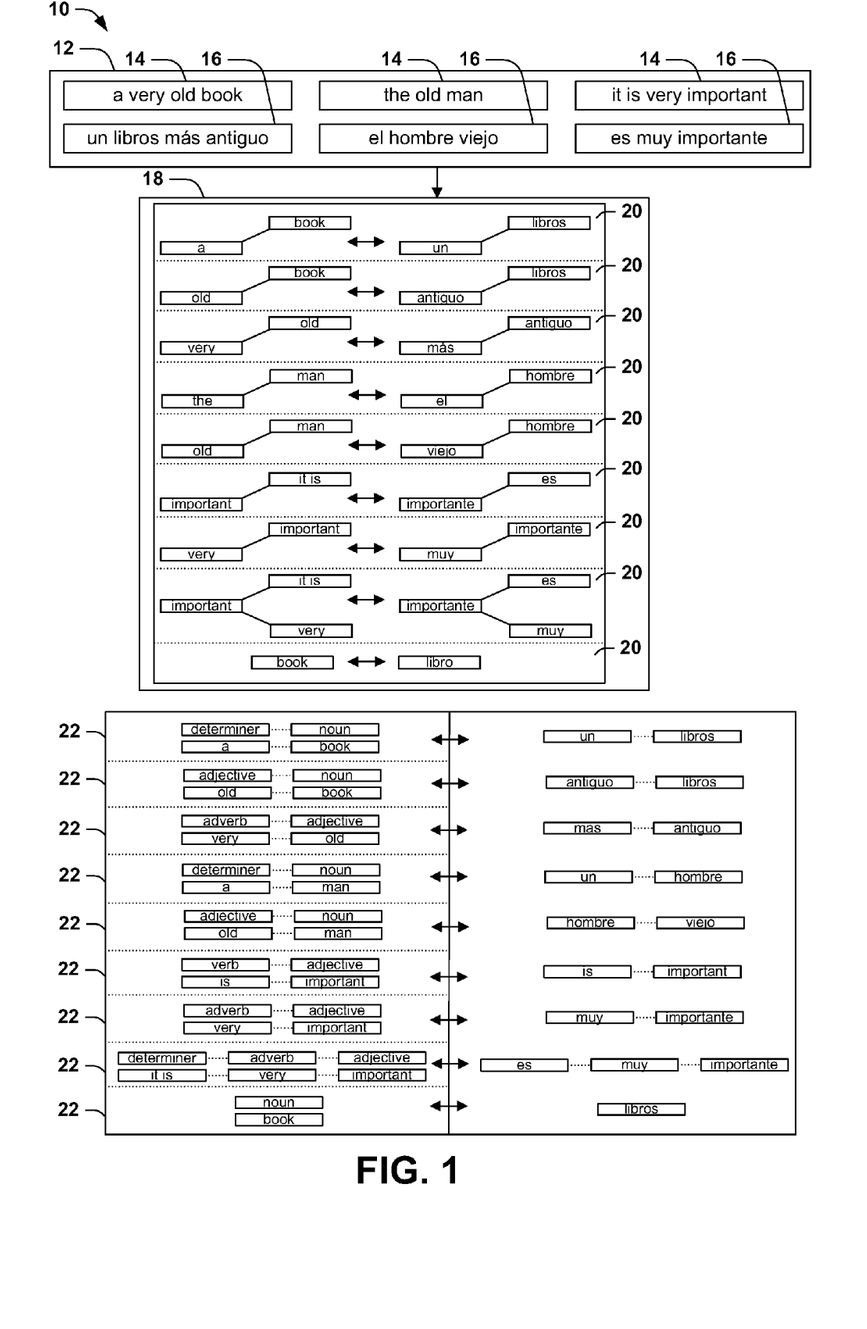
FIG. 1 is an illustration of an exemplary training scenario involving the generating of a language translation rule set comprising at least one language order template.
Figure 2:
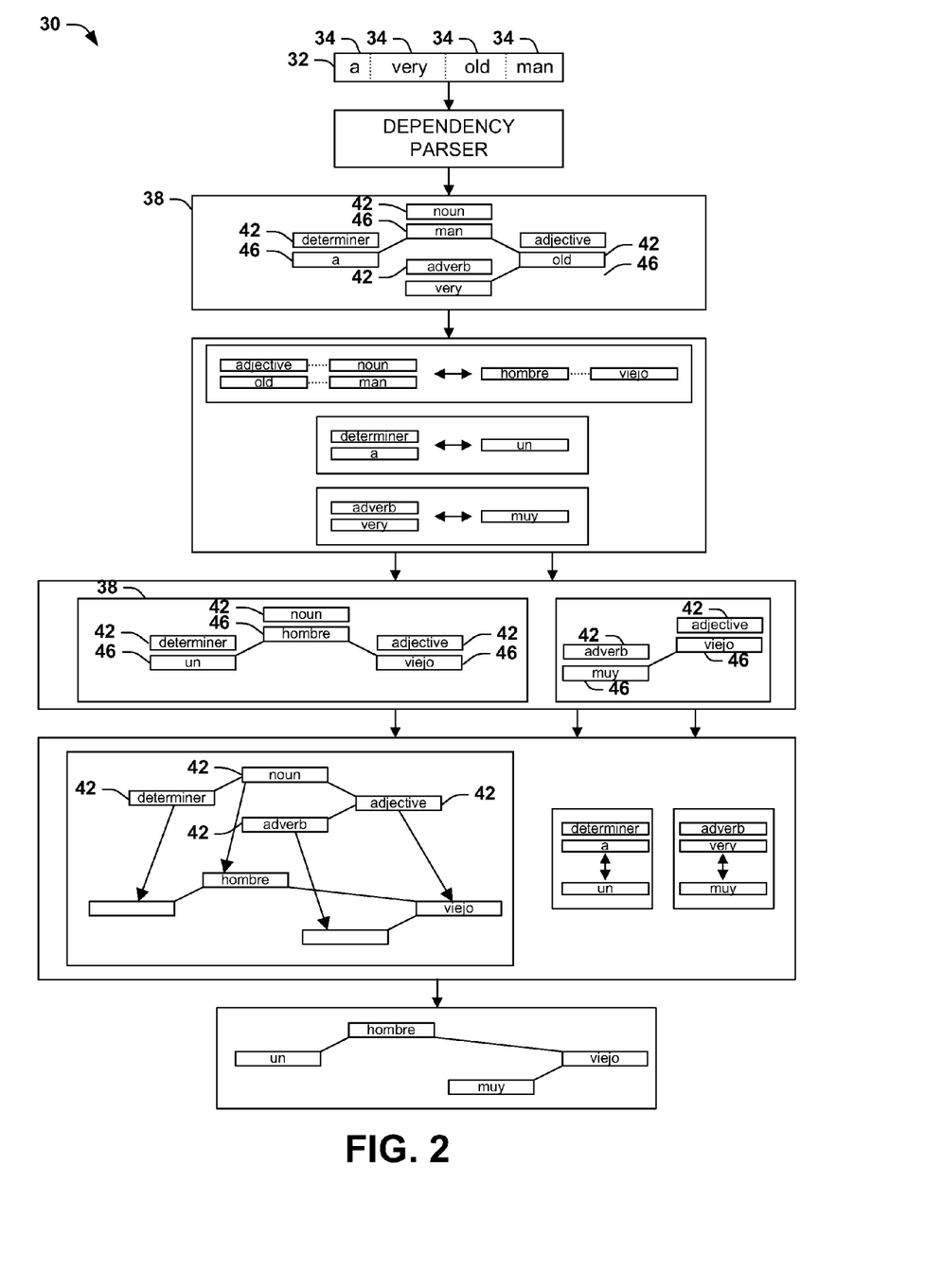
FIG. 2 is an illustration of an exemplary translating scenario involving the translating of a source corpus in a source language into a target language using a language translation rule set comprising at least one language order template.

FIGS. 1-2 together illustrate a machine translation scenario utilizing these techniques. FIG. 1 illustrates an exemplary training scenario 10 wherein a parallel training data set 12 is analyzed to produce a language translation rule set 18. FIG. 2 illustrates an exemplary machine translation scenario 30 depicting the use of the language translation rule set 18 to translate a source corpus 32 specified in a source language into a target corpus 44 specified in a target language.

In the exemplary training scenario 10 of FIG. 1, a training algorithm is directed to a parallel training data set 12, which comprises a set of three parallel fragment pairs having a source training corpus 14 and a parallel target training corpus 16. As illustrated in FIG. 1, the source language is English and the target language is Spanish, and the elements of the source training corpus and the parallel target training corpus comprise (respectively) words written in an English sentence and a word-for-word translation into an equivalent Spanish sentence. The exemplary training scenario 10 illustrates a parse of the parallel training data set 12 to produce parallel element aligned dependency trees for each corpus in the training data. From these parallel element-aligned dependency tree is extracted a language translation rule set 18, comprising (at least) two types of rules derived from the parallel training data set 12: treelet translation pairs for selecting Spanish lexical items given English lexical items, and order templates for selecting an acceptable ordering of Spanish elements given an English tree structure and element types. As illustrated in this exemplary training scenario 10, the alignment rules are specified as dependency treelet translation pairs 20 that specify a hierarchical relationship between various elements. The information represented by a dependency treelet translation pair 20 includes only relative ordering between words included in the treelets, as well as a superior and subordinate lexical relationship between elements, which may facilitate the translation and parsing of the source training corpus 14. Moreover, the dependency treelet translation pairs 20 illustrated in FIG. 1 are configured with a tree structure, which may be handled in modular fashion and concatenated to produce a linguistic hierarchy of arbitrary depth and breadth.

As further illustrated in the exemplary training scenario 10 of FIG. 1, the language translation rule set 18 also comprises language order templates 22, each specifying an ordering of the direct children of a given target element relative to that element, given a matching parent and child set on the source side. The ordering is based not on the ordering of specific elements (such as particular Spanish words), but rather on element types in the source language, such as the parts of speech of the English language. The language order templates 22 are inferred from parallel element-aligned dependency trees by picking each pair of aligned source and target elements and tracking the order and element types of the source parent and all its direct children, the order of the target parent and all its children, and the correspondence between the two. The language order templates 22 may identify the ordering of particular elements of the target language given a particular set of source side matches, but may also be used to choose an ordering for similar elements; e.g., a particular language order template may indicate that Spanish adverbs similar to "muy" and Spanish adjectives similar to "importante" may be ordered in "adverb-adjective" order. In this manner, each language order template may be generalized to specify an ordering of a large number of contextually similar elements of the target language. Moreover, the breadth of generalization may be of many degrees between narrow (e.g., only specifying ordering of synonyms of particular elements) and broad (e.g., specifying ordering of any words of the same parts of speech.) The scope of generality therefore permits a preservation of the context in which the language order template 22 is applicable, while not unduly constraining the template to the elements of the target corpus fragment from which it is derived.

It may be appreciated that the inference of language order templates 22 involves an evaluation of orderings among related elements. For example, language order templates 22 may be devised to represent the ordering in Spanish of the English words "a" and "book," and of the English Spanish words "very" and "old," because such words are lexically related; however, no language order template 22 is generated for ordering "a" and "sold," or "book" and "very," because these words are not related. Thus, the induction of ordering information that informs the generation of language order templates utilizes similar information used in the generation of the dependency treelet translation pairs 20. Accordingly, the language order templates 22 may be developed utilizing the relationship determinations made during the generation of the dependency treelet translation pairs 20. The language order templates 22 may also be defined with reference to particular dependency treelet translation pairs 20; e.g., the language order template 22 defining an ordering of "verb-adjective" may be defined with relation to the dependency treelet translation pair 20 defining the relationships between "es" and "importante." This definition of the language order templates 22 in view of one or more dependency treelet translation pairs 20 promotes the preservation of contextual information (e.g., "verb-adjective" may be a correct pairing for the intransitive verb "es," but other verbs may be associated with different orderings with respect to other element types.) Moreover, the language order templates 22 may be modularly represented, such that a series of language order templates 22 may be selected to determine a correct ordering for a longer sequence of elements of the target language. In this manner, the exemplary training scenario 10 of FIG. 1 illustrates the generation of translation and aligning rules, such as dependency treelet translation pairs 20, as well as language order templates 22, based on the parallel training data set 12.

FIG. 2 illustrates an exemplary translating scenario 30 utilizing the language translation rule set 18 derived in the exemplary training scenario 10 of FIG. 1. In FIG. 2, a source corpus 31 is presented in the source language (in this case, English). The source dependency parser then produces a dependency tree 32 containing a hierarchical arrangement of nodes 34. Next, treelet translation pairs 36 whose source sides are equal to a subgraph of 32 are identified from the training corpus; this shows only three such pairs, though many more are available. Then for each node in treelet translation pair 36, an order template 38 is identified that covers that node and is consistent with the corresponding node in the input tree 32. For example, in the treelet translation pair 36, the node labeled "man" corresponds to the input node 34 labeled "man", which has two direct descendents: the determiner "a" and the adjective "old". An order template 38 is identified that matches the input node 34 "man" along with both of its children, specifying an order that is consistent with the target side of the treelet translation pair 36. Next we consider the node labeled "old" in the treelet translation pair 36. It corresponds to the input node 34 labeled "old", which has one direct descendent labeled "very". A second order template 38 is identified that covers the node "old" with its adjective child. Given a treelet translation pair 36 and having identified matching order templates 38, a tree transduction rule 40 is constructed that is specific to the input corpus 30 by combining the ordering information from the order templates and the lexical translations from the treelet translation pair. A set of tree transduction rules 40 is constructed for each treelet translation pair. Finally, the source dependency tree 32 maybe transduced to a target dependency tree 44 (which is the translation) using the tree transduction rules 40.

Figure 3:
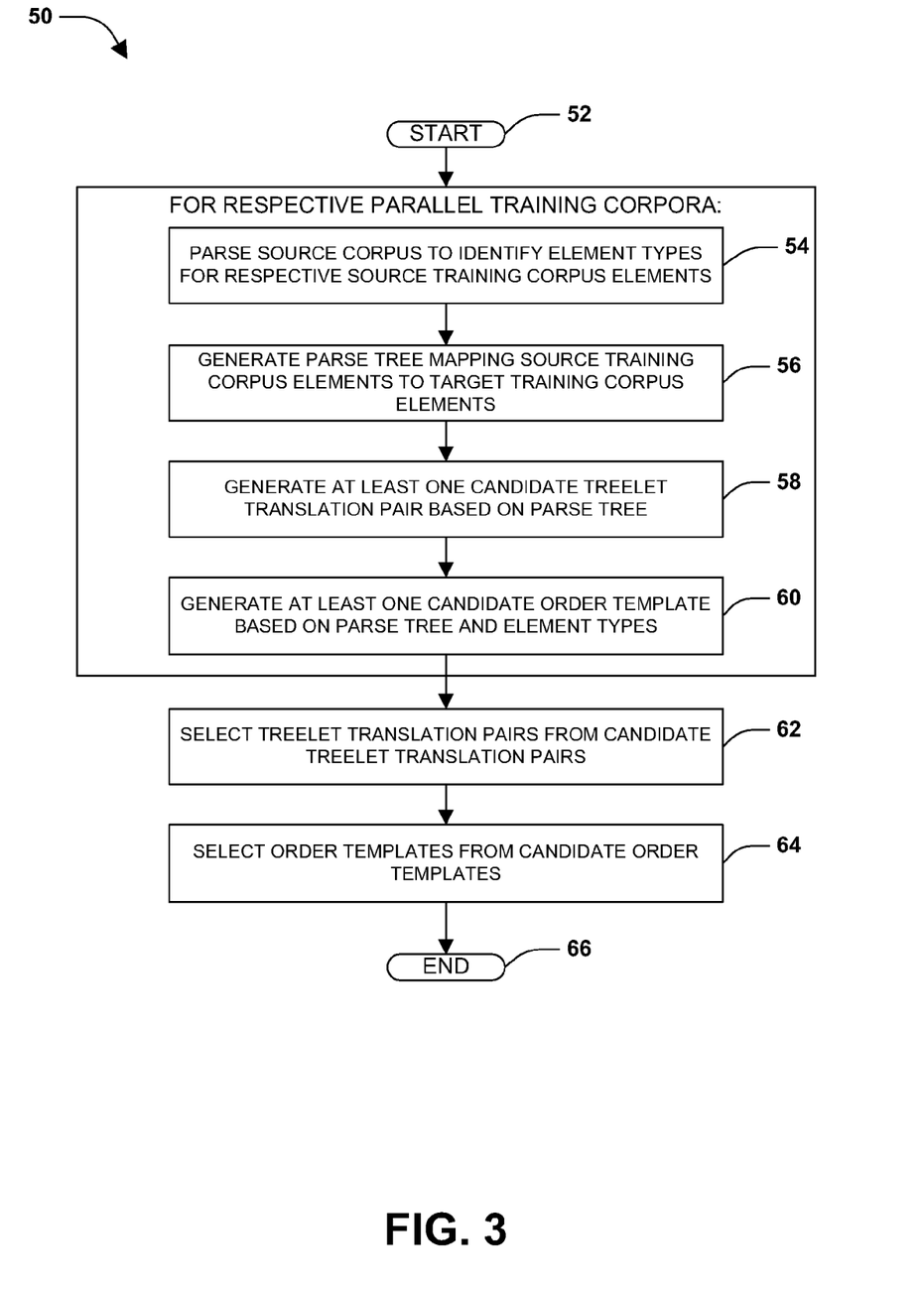
FIG. 3 is a flow diagram illustrating an exemplary method of generating a language translation rule set comprising at least one language order template.

The techniques illustrated in FIGS. 1-2 may be implemented in many embodiments. FIG. 3 illustrates one embodiment that incorporates some of the techniques utilized in the exemplary training scenario 10 of FIG. 1, illustrated here as an exemplary method 50 of generating a language translation rule set comprising at least one language order template, using at least one source training corpus in a source language aligned with a parallel target training corpus in a target language. The exemplary method 50 begins at 52 and involves evaluating respective parallel training corpora in the following manner. First, the exemplary method 50 involves parsing 54 the source training corpus to identify element types for respective elements of the source training corpus (such as the identifying of parts of speech of the words of the source training corpora 16.) The exemplary method 50 also involves generating 56 a parse tree mapping the elements of the source training corpus to the elements of the target training corpus. The exemplary method 50 then involves generating 58 at least one candidate treelet translation pair based no the parse tree, and generating 60 at least one candidate order template based on the parse tree and the element types of the source training corpus. After evaluating the parallel training corpora, the exemplary method 50 generates the language translation rule set by selecting 62 treelet translation pairs from the candidate treelet translation pairs, and by selecting 64 order templates from the candidate order templates. By generating an acceptable set of treelet translation pairs and order templates based on the analyses of the parallel corpora, the exemplary method 50 thereby achieves the generation of a language translation rule set, and so ends at 66.

Figure 4:
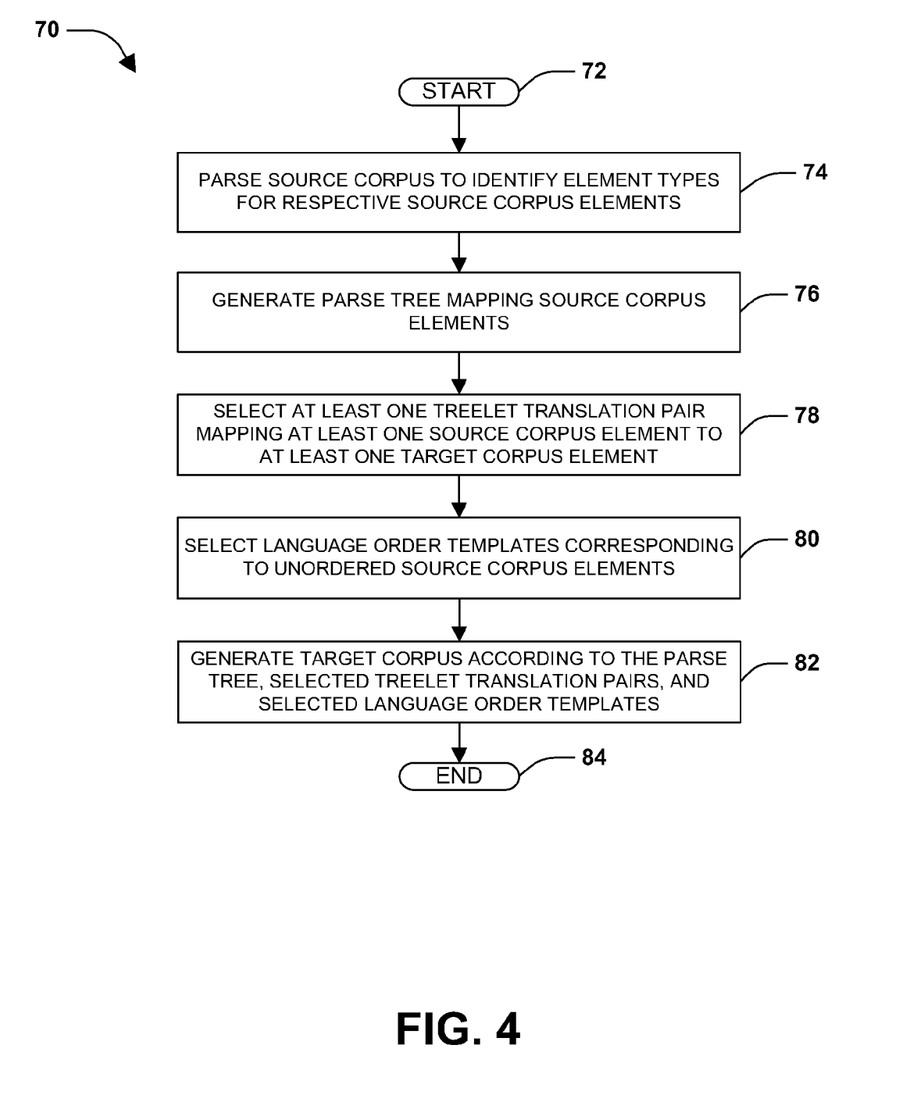
FIG. 4 is a flow diagram illustrating an exemplary method of translating a source corpus in a source language into a target language using a language translation rule set comprising at least one treelet translation pair and at least one language order template.

FIG. 4 illustrates an embodiment that incorporates some of the techniques utilized in the exemplary translating scenario 30 of FIG. 2, illustrated herein as an exemplary method 70 of translating a source corpus in a source language into a target language using a language translation rule set comprising at least one treelet translation pair and at least one language order template. The exemplary method 70 begins at 72 and involves parsing 74 the source corpus to identify element types for respective source corpus elements. The exemplary method 70 also involves generating 76 a parse tree mapping the source corpus elements. The exemplary method 70 also involves selecting 78 at least one treelet translation pair mapping at least one source corpus element to at least one target corpus element, and selecting 80 language order templates corresponding to unordered source corpus elements. The exemplary method 70 also involves generating 82 a target corpus according to the parse tree, selected treelet translation pairs, and selected language order templates. Having generated a translation comprising a target corpus ordered according to the treelet translation pair and the language order templates of the language translation rule set, the exemplary method 70 ends at 84.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary method 70 of FIG. 4) to confer individual and/or synergistic advantages upon such embodiments.

A first aspect that may vary among embodiments of these techniques relates to the manner of building the language order templates and incorporating them in the language translation rule set. As discussed with reference to FIG. 1, the language order templates 22 define the ordering of various element types 42 of various target elements 46, and may be specified with reference to particular elements of the target language (e.g., a particular language order template may indicate that adverbs similar to "very" and adjectives similar to "important" may be ordered in Spanish in "adverb-adjective" order.) The breadth of generalization may be adjusted to improve the heuristic fit with the target language. As one example, the breadth of individual language order templates may be individually adjusted; e.g., while evaluating the target training corpora 16, a training algorithm may extend the breadth of a language order template that appears to be followed in many target corpora, and may narrow the breadth of a language order template that only appears to apply to a small and well-defined set of target language elements.

Figure 5:
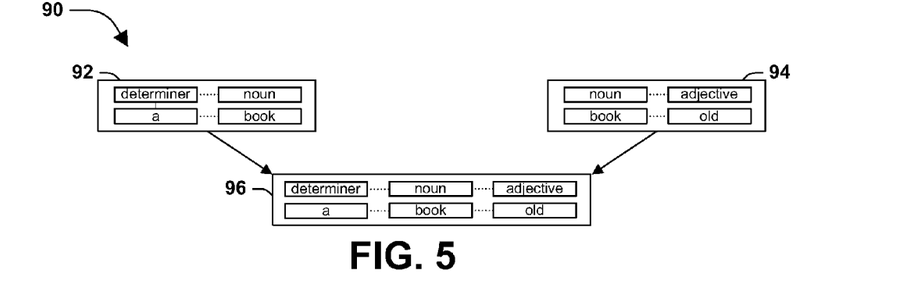
FIG. 5 is an illustration of an exemplary language order template updating scenario involving the generation of a language order template from two smaller language order templates.

A second variation of the training may involve extending various language order templates to fit larger sets of target elements, such as longer phrases of parts of speech in a target language. Where two or more language order templates are frequently utilized concurrently, a composite language order template may be generated that combines the ordering of the elements. Accordingly, techniques for generating language order templates may identify an ordering of target element types comprising at least one element type specified by a first language order template and at least one unspecified element type (i.e., an element type that is not included in the first language order template), where an opportunity exists to create a larger language order template. In this circumstance, a second language order template may be generated, comprising the first language order template and including in the ordering the unspecified element types, and the second language order template may be added to the language translation rule set. FIG. 5 illustrates an exemplary language order template updating scenario 90, wherein a first language order template 92 specifying a "determiner-noun" ordering and a second language order template 94 specifying a "noun-adjective" ordering may be combined to produce a third language order template 96 specifying a "determiner-noun-adjective" ordering. Such composite rules expand the size of the language translation rule set, but may facilitate the machine translation by specifying the ordering of larger sets of element types while applying fewer rules to the target elements.

A third variation of the training involves deriving other types of information from the target training corpora 16 while generating the language order templates 22, which results in a language translation rule set 18 comprising various types of information along with the ordering. The language translation rule set 18 may include information for selecting aligned elements of the target language to match elements of the source language, for identifying hierarchical relationships between elements, and/or for identifying element types (such as parts of speech) of the elements. As a first example, in addition to generating the language order templates 22, the training may also generate an alignment model of the source language and the target language according to the source training corpora 14 and the parallel target training corpora 16, which may be added to the language translation rule set 18. As illustrated in FIG. 1, the alignment model may comprise at least one dependency treelet translation pair 20 that aligns source elements with target elements, and that defines superior/subordinate relationships between such elements and element types. Moreover, such additional rules may be related to the language order templates 22; e.g., the language order templates 22 may be specified with contextual reference to the elements of a particular dependency treelet translation pair 20.

As a second example, the training may generate not only language order templates 22, but also source language order templates that specify the contextual ordering of element types in the source language, based on analyses of the source training corpora 14. These source language order templates may be derived in a similar manner to the generation of the language order templates, i.e., by identifying element types for respective source elements of the source language, generating source language order templates specifying an ordering of at least two element types according to the source training corpus, and adding the source language order template to the language translation rule set. The source language order templates may be useful, e.g., for creating a bidirectional language translation rule set 18 that can also translate from the target language back to the source language, and/or for additionally informing the translation from the source language to the target language with linguistic information derived from a source corpus (e.g., hierarchical relationships and element types defined among the elements of the source corpus.) The source language order templates may also be useful where an ordering of language elements cannot be identified, e.g., where two language order templates are in conflict or where the ordering is ambiguous. In this case, a language order template may be generated based on the ordering of target elements aligned with source elements specified in at least one source language order template, e.g., by specifying an ordering based on the ordering of analogous element types in the source language order template for the parallel source corpus. This might not be a completely accurate ordering, but it may be preferable to have a somewhat accurate ordering of such elements in the target language than not having a language order template that can parse the combination of element types. Those of ordinary skill in the art may devise many types of rules and information that may be added to the language translation rule set in addition to the language order templates during the training of the machine translator on the parallel training data set in accordance with the techniques discussed herein.

A second aspect that may vary among implementations of these techniques relates to the translation of a source corpus to a target corpus using the orderings specified by the language order templates in the language translation rule set. The exemplary translation scenario 40 of FIG. 1 represents but one of many types and organizations of machine translation techniques, and the techniques discussed herein relating to the use of language order templates may be incorporated in many aspects of the translation. A first variation relates to the use of an alignment model, such as a set of dependency treelets; for example, the language translation rule set may include an alignment model of the source language and the target language, and the selecting may comprise selecting target elements aligned with source elements of the source corpus according to the alignment model. The alignment model may be generated during the training whereby the language order templates are generated, or may be generated through a separate training, etc. Many types of alignment models may be generated and utilized in this manner; e.g., the alignment model may comprise at least one dependency treelet aligning source elements with target elements. Accordingly, and as illustrated in FIG. 2, the selecting may comprise identifying at least one dependency treelet 36 matching the source elements and selecting the target elements of the dependency treelet 36. Moreover, if the language order templates 22 are specified in relation to the dependency treelets 36, the choosing may be performed by choosing at least one language order template 22 specifying an ordering in the target language of at least two element types of the target elements and specifying at least one element type for respective target elements of the dependency treelet 36. As a second example of this variation, the alignment model may specify an alignment probability between at least one source element and at least one target element; e.g., dependency trees may be generated along with a weight that induces a preference for the selection of more common or useful dependency trees over less common or useful dependency trees. In this scenario, the selecting may involve selecting target elements 46 that are aligned with source elements (e.g., via a dependency treelet 36) that together present acceptable alignment probabilities according to the alignment model. Many variations in the generating and use of the alignment models, and in the relationships of the alignment models to the language order templates 22, may be devised by those of ordinary skill in the art while implementing the techniques discussed herein.

A second variation of the translating involves a continuation of the training and the refinement of the language translation rule set during the translation. As one example, the language translation rule set may be supplemented with additional language order templates to cover newly encountered linguistic constructs, e.g., where the machine translator identifies an ordering of target element types that is not specified by a language order template. In this circumstance, the machine translator may generate a new language order template that specifying an ordering of the target element types in the target language, and may add the new language order template to the language translation rule set. For example, if the machine translator identifies a frequent pairing of language order templates (e.g., a "noun-adjective" language order template and an "adverb-adjective" language order template) during the translating, it may generate a new language order template specifying the ordering (e.g., "noun-adverb-adjective" ordering) and add it to the language translation rule set. Many ways of updating the language translation rule set during the translating may be devised by those of ordinary skill in the art in accordance with the techniques discussed herein.

A third variation of the translating relates to the inclusion of source language order templates. Whereas the language order templates specify the ordering of elements of the target corpus based on the grammatical constraints of the target language, the source language order templates specify the ordering of elements of the source corpus based on the grammatical constraints of the source language. The source language order templates may be generated and added to the language translation rule set based on analyses of the source training corpora, and may contribute to the translating in many ways. As a first example of this third variation, the source language order templates may be used to resolve ambiguities in the source corpus, where two possible interpretations may be derived based on two different selections of source elements. For example, English phrases involving the words "man" and "walking" may be parsed either as a noun/verb combination ("the man is walking") or as an adjective/noun combination ("the walking man crossed the street"), and the ambiguity may be resolved with reference to source language order templates that indicate the more likely construction based on the ordering of the elements. Accordingly, the source language order templates may be used to verify identified element types against at least one source language order template matching the element types of the source elements of the source corpus; e.g., the aligning of elements according to the alignment model may be verified by checking the hierarchical relationships (such as defined by dependency treelets) against the source language order templates to verify a desirably accurate ordering.

As a second example of this third variation, the source language order templates may be used to order elements of the target language that cannot be adequately ordered by the language order templates. For example, an unusual linguistic construct (such as an unusual turn of phrase) may result in a selection of target elements that are not covered by the language order templates, and the machine translator may fail to choose a language order template specifying an ordering in the target language of at least two element types of the target elements. In this circumstance, the machine translator may choose an ordering of the target elements reflecting the ordering of the source elements in the source language by identifying source elements aligned with the target elements and choosing source language order templates that specify an ordering in the source language of at least two element types of the source elements. The ordering information may be used directly to order the elements of the target corpus, or may be used to generate a new language order template that adequately specifies the ordering of the target elements. Those of ordinary skill in the art may devise many uses of source language order templates to facilitate the machine translation of a source corpus into a target corpus in accordance with the techniques discussed herein.

A third aspect that may vary among implementations of these techniques relates to the manner of performing the ordering. It may be appreciated that the modular representation of the language order templates may be applied to the set of aligned target elements (which may be organized according to a dependency tree) in many ways, and that the sequence of applying the language order templates may lead to semantically different translations (e.g., "old and very wise man" vs. "very old and wise man.") The choice of language order templates may therefore resemble an iterative search, wherein a first language order template is chosen from the language translation rule set to order at least two target elements; a second language order template is chosen to align at least one not-yet-ordered target element with respect to one already-ordered target element; etc. This iteration may continue until the chosen language order templates adequately cover the set of target elements such that a properly ordered target corpus may be generated. Moreover, it may be desirable, for any iteration, to test multiple language order templates, and to evaluate the remainder of the iterative process if respective language order templates are chosen. Thus, the choosing of language order templates may be performed as a recursive search, which may evaluate the search space of order templates for sequences of orderings that produce a desirable target corpus.

Figure 6:
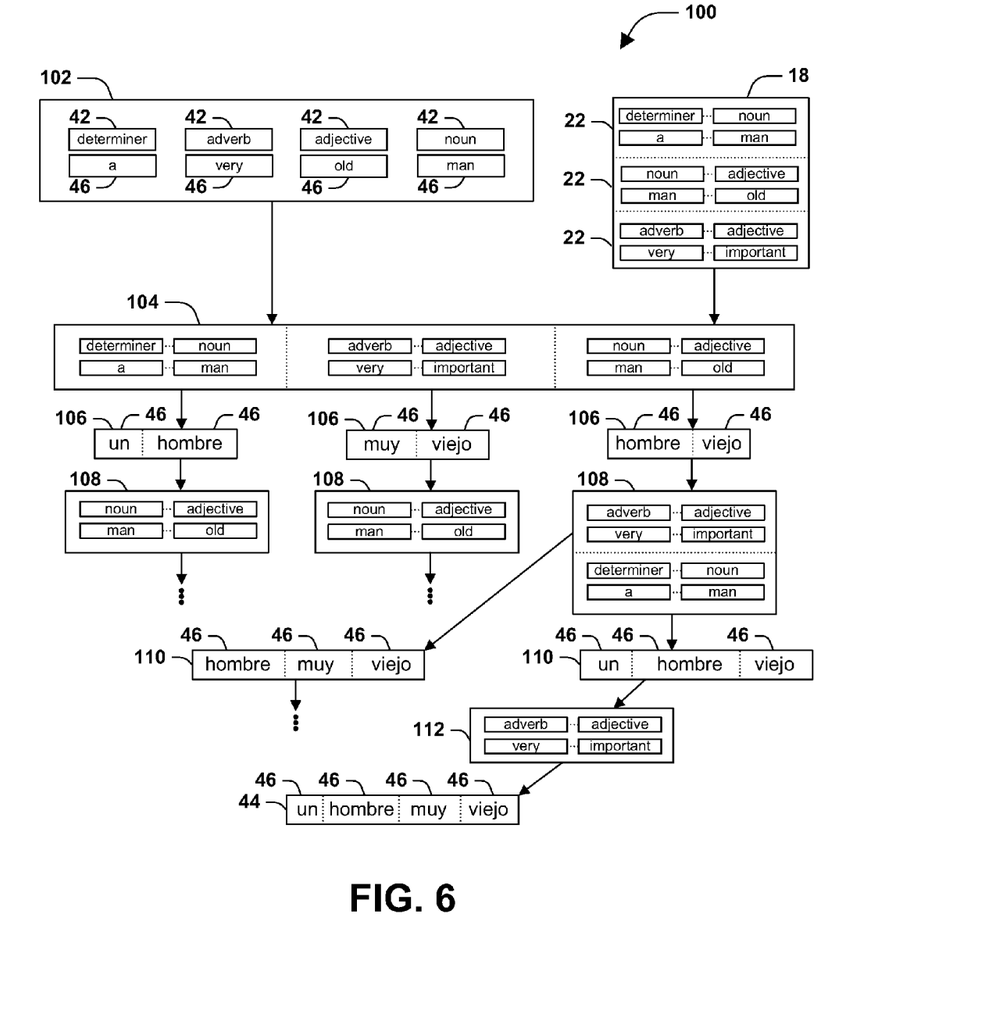
FIG. 6 is an illustration of an exemplary recursive search scenario 100 involving a recursive evaluation of candidate language order templates against a set of ordered and unordered target elements.

FIG. 6 illustrates an exemplary recursive search scenario 100 wherein a set 102 of target elements 46 is to be ordered using a language translation rule set 18 comprising language order templates 22. The exemplary recursive search scenario 100 may begin by considering a first candidate set 104 of language order templates 22 that may applied to the set 102 of target elements 46. For example, the "determiner-noun" language order template 22 may first be used to order the target elements 46 "un" and "hombre"; the "adverb-adjective" language order template 22 may first be used to order the target elements 46 "muy" and "viejo"; or the "noun-adjective" language order template 22 may first be used to order the target elements 46 "hombre" and "viejo." The machine translator may opt to try all three variations, wherein each trial involves a first set 106 of ordered target elements 46 and a second candidate set 108 of template rules that may be utilized to order at least one unordered target element 46 with at least one target element 46 ordered by the first chosen language order template 22. For example, if the "noun-adjective" language order template 22 is tried, the first set 106 of ordered target elements 46 ("hombre viejo") may next be aligned with either the adverb "muy" using an "adverb-adjective" language order template 22 or with the determiner "un" using a "determiner-noun" language order template 22. Moreover, either choice may produce a second set 110 of ordered target elements 46 and a third candidate set 112 of language order templates 22, etc. The recursive search may continue until a desirable set and sequence of language order templates 22 are identified for application to the target elements 46 to produce an acceptably ordered target corpus 44.

It may be appreciated that an exhaustively recursive search of this nature may be computationally intensive, e.g., if the number of target elements 46 is large, if the types of the target elements 46 are varied, and/or if the number and complexity of the language order templates 22 are large. Therefore, in many embodiments, the recursive search may be adjusted to pare down the search space, e.g., by omitting the evaluation of sequences that do not appear likely to produce favorable orderings, and/or by recursively evaluating more promising partial orderings before less promising partial orderings. One such example involves a formulation of the recursive search as a beam search, wherein, at any stage of recursion, only a small number of promising candidates are chosen for evaluation at the next stage of recursion. A beam search may be advantageous due to the search parameters that may be adjusted to improve the speed and accuracy of the search. As a first example, the beam search may be constrained, for respective chosen language order templates, by a maximum of recursively evaluated language order templates. As a second example, where the language order templates comprising an ordering probability (e.g., specifying that the "noun-adverb-verb" ordering is a more preferable or common ordering than an "noun-verb-adverb" ordering), the beam search may be constrained by a minimum ordering probability for recursively evaluated language order templates, and/or a maximum of recursively evaluated language order templates before ordering the target elements according to the ordering specified by the at least one chosen language order template together having an acceptable ordering probability. Those of ordinary skill in the art may be able to devise many types of recursive searches and adjustments thereof that may be suitable for recursively evaluating the choosing of language order templates in accordance with the techniques discussed herein.

These and other variations of the aspects discussed herein may be incorporated in various embodiments, such as the exemplary method 50 of FIG. 3 and the exemplary method 70 of FIG. 4. Moreover, such embodiments may include combinations of such variations, which may operate independently to produce multiple advantages, and/or cooperatively produce synergistic advantages. For example, the translation of a source corpus to a target corpus may be viewed as an end-to-end method involving both the training of the machine translator (e.g., by generating a language translation rule set, including target language translation templates, from a set of source training corpora and parallel target training corpora) and the translation of the source corpus using the target language translation templates for ordering the aligned target elements. Moreover, the end-to-end method may generate an alignment model during the training, such as a set of dependency treelets, and may utilize the dependency treelets during the translation and ordering; and/or may generate a set of source language order templates, which may be used (e.g.) to verify the dependency treelet and/or to specify orderings of target element types that are not covered by the language order templates; etc. Additionally, the language order templates may be supplemented during the translating, e.g., by generating new language order templates to specify orderings of newly encountered combinations of target element types, etc. Many such combinations of the variations of the aspects discussed herein may be devised by those of ordinary skill in the art while implementing the techniques to achieve the translation and ordering of the source corpus according to the language order templates.

Figure 7:
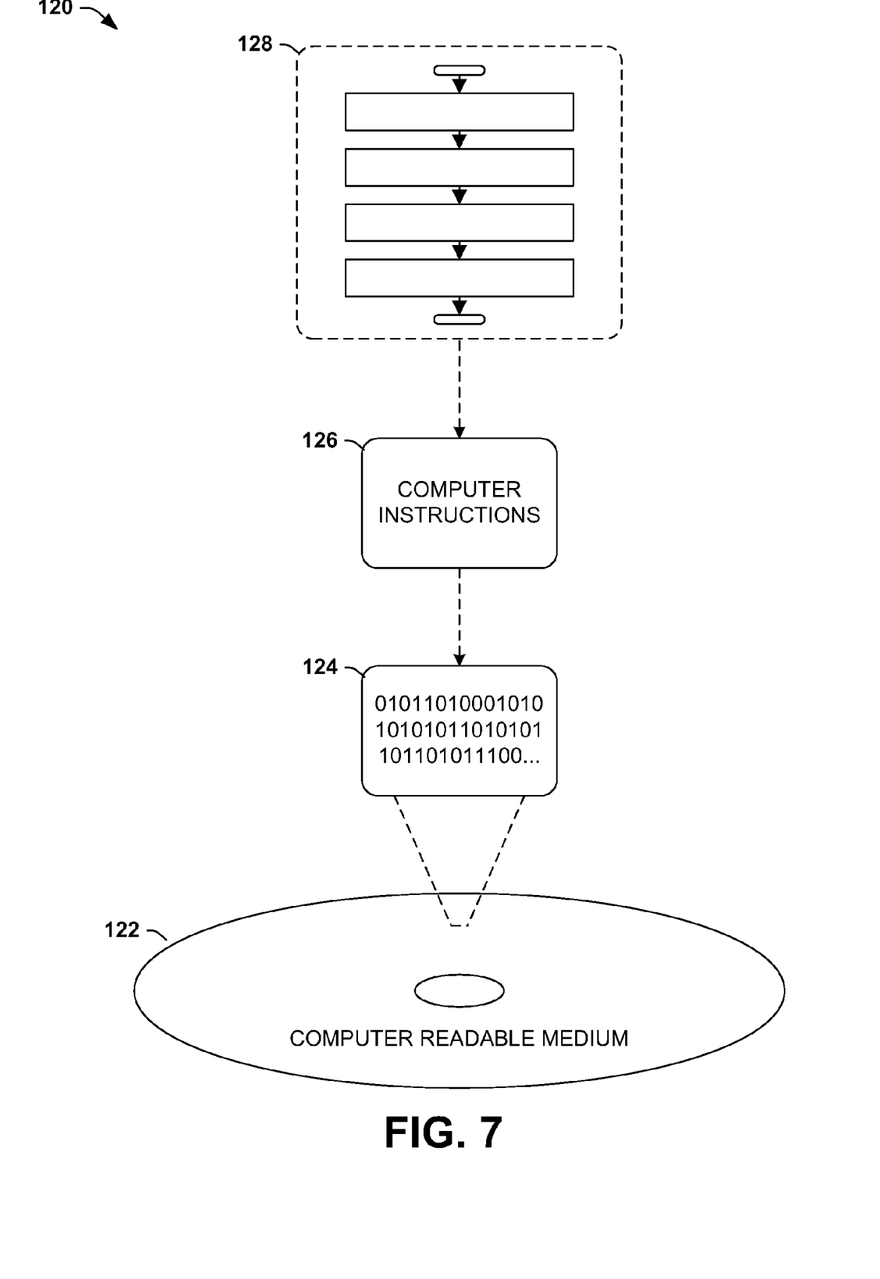
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 120 comprises a computer-readable medium 122 (e.g., a CD-R, DVD-R, or a platter of a hard disk drive), on which is encoded computer-readable data 124. This computer-readable data 124 in turn comprises a set of computer instructions 126 configured to operate according to the principles set forth herein. In one such embodiment, the processor-executable instructions 126 may be configured to perform a method of generating a language translation rule set comprising at least one language order template using at least one source training corpus in a source language aligned with a parallel target training corpus in a target language, such as the exemplary method 50 of FIG. 3. In another such embodiment, the processor-executable instructions 126 may be configured to implement a method of translating a source corpus in a source language into a target language using a language translation rule set comprising at least one treelet translation pair and at least one language order template, such as the exemplary method 70 of FIG. 4. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
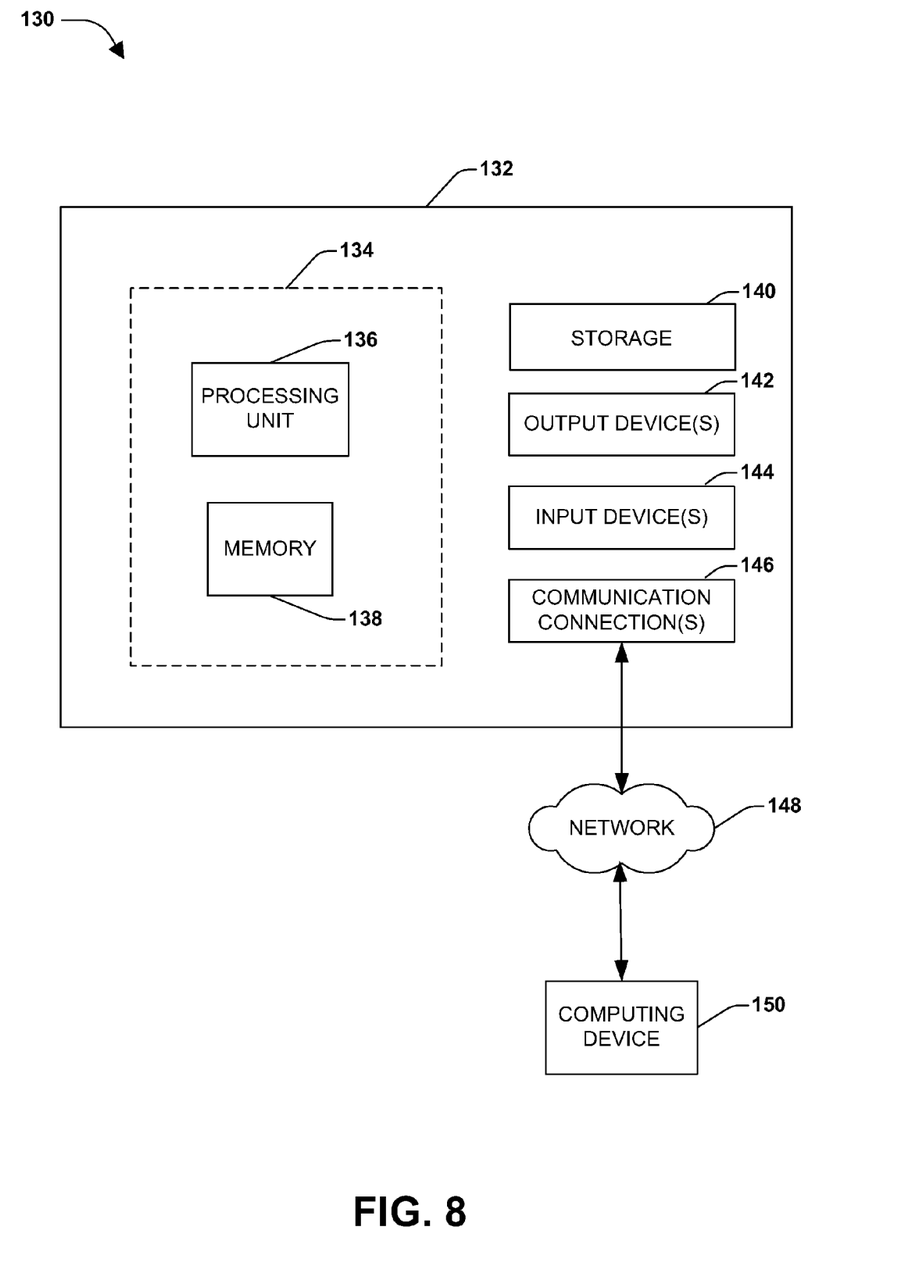
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 8 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 8 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating a language translation rule set comprising at least one language order template using at least one source training corpus in a source language aligned with a parallel target training corpus in a target language on a computer having a processor, the method comprising:
   executing on the processor instructions configured to:
      for respective parallel training corpora:
         parse the source corpus to identify element types for respective source training corpus elements,
         generate a parse tree mapping source training corpus elements to parallel target training corpus elements,
         generate at least one candidate treelet translation pair based on the parse tree, and
         generate at least one candidate order template based on the parse tree and the element types;
      add at least one treelet translation pair from the candidate treelet translation pairs to the language translation rule set; and
      add at least one order template from the candidate order templates to the language translation rule set.

2. The method of claim 1, the instructions configured to:
   upon identifying an ordering of element types comprising at least one element type specified by a first language order template and at least one unspecified element type:
      generate a second language order template comprising the first language order template and including in the ordering the unspecified element types, and
      add the second language order template to the language translation rule set.

3. The method of claim 1, the instructions configured to:
   generate an alignment model of the source language and the target language according to the source training corpus and the parallel target training corpus, and
   add the alignment model to the language translation rule set.

4. The method of claim 3, the alignment model comprising at least one dependency treelet aligning source elements with target elements.

5. The method of claim 1, the instructions configured to:
   identify element types for respective source elements of the source language;
   generate at least one source language order template specifying an ordering of at least two element types according to the source training corpus; and
   add the source language order template to the language translation rule set.

6. The method of claim 5, the instructions configured to:
   upon failing to identify element types of respective target elements of the target language:
      generate at least one language order template comprising the ordering of target elements aligned with source elements specified in at least one source language order template, and
      add the at least one language order template to the language translation rule set.

7. A method of translating a source corpus in a source language into a target language using a language translation rule set comprising at least one treelet translation pair and at least one language order template on a computer having a processor, the method comprising:
   executing on the processor instructions configured to:
      parse the source corpus to identify element types for respective source corpus elements;
      generate a parse tree mapping the source corpus elements;
      select at least one treelet translation pair mapping at least one source corpus element to at least one target corpus element;
      select language order templates corresponding to unordered source corpus elements; and generate a target corpus according to the parse tree, selected treelet translation pairs, and selected language order templates.

8. The method of claim 7:
the language translation rule set comprising an alignment model of the source language and the target language, and
the selecting comprising: selecting target elements aligned with source elements of the source corpus according to the alignment model.

9. The method of claim 8:
the alignment model comprising at least one dependency treelet aligning source elements with target elements, and
the selecting comprising:
identifying at least one dependency treelet matching the source elements, and
selecting the target elements of the dependency treelet.

10. The method of claim 9, the choosing comprising: choosing at least one language order template specifying an ordering in the target language of at least two element types of the target elements and specifying at least one element type for respective target elements of the dependency treelet.

11. The method of claim 8:
the alignment model specifying an alignment probability between at least one source element and at least one target element; and
the selecting comprising: selecting target elements aligned with source elements that together present acceptable alignment probabilities according to the alignment model.

12. The method of claim 7, the language translation rule set comprising at least one source language order template.

13. The method of claim 12, the selecting comprising: identifying element types of the source elements;
verifying identified element types against at least one source language order template matching the element types of the source elements of the source corpus; and
selecting target elements of element types matching the element types of the source elements.

14. The method of claim 12, the choosing comprising:
upon failing to choose a language order template specifying an ordering in the target language of at least two element types of the target elements:
identify source elements aligned with the target elements;
choose at least one source language order template specifying an ordering in the source language of at least two element types of the source elements; and
choose at least one language order template comprising the ordering of target elements aligned with the source elements specified in the least one chosen source language order template.

15. The method of claim 7, the instructions configured to:
upon identifying an ordering of target element types not specified by a language order template:
generate a new language order template specifying an ordering of the target element types in the target language, and
add the new language order template to the language translation rule set.

16. The method of claim 7, the choosing comprising:
choosing a first language order template specifying an ordering in the target language of at least two element types of the target elements, and
recursively choosing a language order template specifying an ordering in the target language of:
at least one element type of at least one unordered target element, and
at least one element type of at least one ordered target element.

17. The method of claim 16, the recursively choosing performed according to a beam search.

18. The method of claim 17, the beam search constrained, for respective chosen language order templates, by a maximum of recursively evaluated language order templates.

19. The method of claim 17:
respective language order templates comprising an ordering probability, and
the beam search constrained by at least one of:
a minimum ordering probability for recursively evaluated language order templates, and
a maximum of recursively evaluated language order templates before ordering the target elements according to the ordering specified by the at least one chosen language order template together having an acceptable ordering probability.

20. A nonvolatile memory comprising processor-executable instructions that, when executed by a processor of a device, cause the device to translate a source corpus in a source language into a target language using a language translation rule set comprising at least one treelet translation pair and at least one language order template by:
parsing the source corpus to identify element types for respective source corpus elements;
generating a parse tree mapping the source corpus elements;
selecting at least one treelet translation pair mapping at least one source corpus element to at least one target corpus element;
selecting language order templates corresponding to unordered source corpus elements; and
generating a target corpus according to the parse tree, selected treelet translation pairs, and selected language order templates.

* * * * *